US009894961B2

(12) United States Patent
Doremus et al.

(10) Patent No.: US 9,894,961 B2
(45) Date of Patent: Feb. 20, 2018

(54) ARTICLE WITH COLORING LAYER AND CONTROL SURFACE LAYER

(71) Applicant: NIKE, Inc., Beaverton, OR (US)

(72) Inventors: Harleigh Doremus, Portland, OR (US); David P. Jones, Beaverton, OR (US); Ryan R. Larson, Portland, OR (US); Todd W. Miller, Beaverton, OR (US)

(73) Assignee: NIKE, Inc., Beaverton, OR (US)

(*) Notice: Subject to any disclaimer, the term of this patent is extended or adjusted under 35 U.S.C. 154(b) by 0 days.

(21) Appl. No.: 15/170,135

(22) Filed: Jun. 1, 2016

(65) Prior Publication Data

US 2016/0270478 A1 Sep. 22, 2016

Related U.S. Application Data

(63) Continuation of application No. 14/160,732, filed on Jan. 22, 2014, now Pat. No. 9,375,051.

(51) Int. Cl.

| | |
|---|---|
| ***B32B 3/00*** | (2006.01) |
| ***A43B 23/02*** | (2006.01) |
| ***A43D 8/16*** | (2006.01) |
| ***A43D 95/14*** | (2006.01) |
| ***A43B 1/00*** | (2006.01) |

(Continued)

(52) U.S. Cl.

CPC .......... *A43B 23/026* (2013.01); *A43B 1/0027* (2013.01); *A43B 3/0078* (2013.01); *A43B 3/0084* (2013.01); *A43B 23/0205* (2013.01); *A43B 23/0225* (2013.01); *A43B 23/0235* (2013.01); *A43B 23/0245* (2013.01); *A43D 8/16* (2013.01); *A43D 8/22* (2013.01); *A43D 95/14* (2013.01); *B41J 3/4073* (2013.01); *B41J 3/4078* (2013.01)

(58) Field of Classification Search

CPC .............. A43B 23/026; A43B 23/0205; A43B 23/0225; A43B 23/0235; A43B 23/0245; A43B 1/0027; A43B 3/0078; A43B 3/0084; A43D 8/16; A43D 8/22; B41J 3/4073; B41J 3/4078

See application file for complete search history.

(56) References Cited

U.S. PATENT DOCUMENTS

| | | | |
|---|---|---|---|
| 3,191,321 | A | 6/1965 | Eugen |
| 4,204,346 | A | 5/1980 | Fugere |

(Continued)

FOREIGN PATENT DOCUMENTS

| | | | |
|---|---|---|---|
| EP | 1726444 | A1 | 11/2006 |
| EP | 1825996 | A1 | 8/2007 |

(Continued)

OTHER PUBLICATIONS

Asics Gel Noosa Tri 25th Racing Shoes (Yellow/Green) [ASI926], [retrieved on Apr. 1, 2010]. Retrieved from the Internet: pp. 1-8.

(Continued)

*Primary Examiner* — Elizabeth E Mulvaney
(74) *Attorney, Agent, or Firm* — Quinn IP Law

(57) ABSTRACT

An article, such as an article of footwear or an article of apparel, includes an upper having a gradient-like coloring pattern. The article further includes protruding elements configured in a pattern that corresponds to the coloring pattern. The article may have a layered structure including a base layer, a coloring ink layer and a layer of protruding elements.

22 Claims, 16 Drawing Sheets

(51) Int. Cl.

| | |
|---|---|
| *A43B 3/00* | (2006.01) |
| *A43D 8/22* | (2006.01) |
| *B41J 3/407* | (2006.01) |

(56) References Cited

U.S. PATENT DOCUMENTS

| | | | |
|---|---|---|---|
| D265,437 | S | 7/1982 | Vermonet |
| 5,216,827 | A | 6/1993 | Cohen |
| 8,356,429 | B2 | 1/2013 | Eder et al. |
| 2003/0167658 | A1 | 9/2003 | Davis |
| 2004/0088888 | A1 | 5/2004 | Johnston |
| 2006/0159869 | A1 | 7/2006 | Kramer et al. |
| 2006/0174520 | A1 | 8/2006 | Wu |
| 2008/0005930 | A1 | 1/2008 | Skirrow |
| 2010/0077637 | A1 | 4/2010 | Hatzilias |
| 2011/0247240 | A1 | 10/2011 | Eder et al. |
| 2012/0019579 | A1 | 1/2012 | Usuda et al. |
| 2012/0055044 | A1 | 3/2012 | Dojan et al. |
| 2012/0117826 | A1 | 5/2012 | Jarvis |
| 2012/0180341 | A1 | 7/2012 | Crowley, II et al. |
| 2012/0297643 | A1 | 11/2012 | Shaffer et al. |
| 2012/0302140 | A1 | 11/2012 | Park |
| 2012/0306125 | A1 | 12/2012 | Dean |

FOREIGN PATENT DOCUMENTS

| | | | |
|---|---|---|---|
| EP | 2594146 | A1 | 5/2013 |
| WO | 2007147175 | A2 | 12/2007 |
| WO | 2008038041 | A1 | 4/2008 |
| WO | 2015112254 | A1 | 7/2015 |

OTHER PUBLICATIONS

Calvy Click., Interview: Breaking Down Asics GEL-NOOSA Tri Collection, [retrieved on Nov. 12, 2012 ]. Retrieved from the Internet: pp. 1-11.

Cory Lowe.,La Sportiva Debuts 15 New Footwear Styles for Spring 2014, [retrieved on Jul. 22, 2013]. Retrieved from the Internet: pp. 1-6.

International Preliminary Report on Patentability for Application No. PCT/US2014/067239, dated Aug. 4, 2016, 15 pages.

International Search Report and Written Opinion for Application No. PCT/US2014/067239, dated Apr. 1, 2015.

Office Communication dated Jul. 8, 2016 for European Application No. 14821916.5, 2 pages.

ARTICLE WITH COLORING LAYER AND CONTROL SURFACE LAYER

CROSS-REFERENCE TO RELATED APPLICATION

This application is a continuation of co-pending U.S. application Ser. No. 14/160,732 filed Jan. 22, 2014, entitled “Article With Coloring Layer And Control Surface Layer”, the disclosure of which application is hereby incorporated by reference in its entirety.

BACKGROUND

The present embodiments relate generally to articles, including articles of footwear and articles of clothing or apparel, and in particular to articles with external coloring layers and control surface layers.

Articles of footwear generally include two primary elements: an upper and a sole structure. The upper is often formed from a plurality of material elements (e.g., textiles, polymer sheet layers, foam layers, leather, synthetic leather) that are stitched or adhesively bonded together to form a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust the fit of the footwear, as well as permitting entry and removal of the foot from the void within the upper. In addition, the upper may include a tongue that extends under the lacing system to enhance adjustability and comfort of the footwear, and the upper may incorporate a heel counter.

SUMMARY

In one aspect, a method of making an article of footwear includes printing a coloring ink layer onto a surface of a base material element, the resulting coloring ink layer having an inner side disposed against the surface of the base material element and an outer side that is opposite of the inner side. The method also includes printing a plurality of protruding elements onto the outer side of the coloring ink layer, thereby forming a composite structure comprised of the base material element, the coloring ink layer and the plurality of protruding elements. The method includes forming an upper for the article of footwear from the composite structure.

In another aspect, an upper for an article of footwear includes a layered structure that is further comprised of a base layer made of a first material, a coloring ink layer that covers at least a portion of the base layer (where the coloring ink layer is made of a second material) and a control surface layer disposed on the coloring ink layer. The control surface layer is made of a third material. The first material is different from the second material and the second material is different from the third material. Portions of the coloring ink layer are visible on an exterior surface of the upper.

In another aspect, an upper for an article of footwear includes a surface layer and a plurality of protruding elements disposed on the surface layer. A region of the upper has a first boundary portion, a second boundary portion and an intermediate portion disposed between the first boundary portion and the second boundary portion. The region includes a portion of the surface layer and at least some of the plurality of protruding elements. The surface layer has a color gradient in the region that changes between a first color at the first boundary portion and a second color at the second boundary portion. A property of the plurality of protruding elements disposed within the region changes across the region in a manner that corresponds to the color gradient.

In another aspect, a method of making an article includes printing a coloring ink layer onto a surface of a base material element, the resulting coloring ink layer having an inner side disposed against the surface of the base material element and an outer side that is opposite of the inner side. The method also includes printing a plurality of protruding elements onto the outer side of the coloring ink layer, thereby forming a composite structure comprised of the base material element, the coloring ink layer and the plurality of protruding elements. The method includes forming the article from the composite structure.

In another aspect, an article includes a layered structure that is further comprised of a base layer made of a first material, a coloring ink layer that covers at least a portion of the base layer (where the coloring ink layer is made of a second material) and a control surface layer disposed on the coloring ink layer. The control surface layer is made of a third material. The first material is different from the second material and the second material is different from the third material. Portions of the coloring ink layer are visible on an exterior surface of the article.

In another aspect, an article includes a surface layer and a plurality of protruding elements disposed on the surface layer. A region of the upper has a first boundary portion, a second boundary portion and an intermediate portion disposed between the first boundary portion and the second boundary portion. The region includes a portion of the surface layer and at least some of the plurality of protruding elements. The surface layer has a color gradient in the region that changes between a first color at the first boundary portion and a second color at the second boundary portion. A property of the plurality of protruding elements disposed within the region changes across the region in a manner that corresponds to the color gradient.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
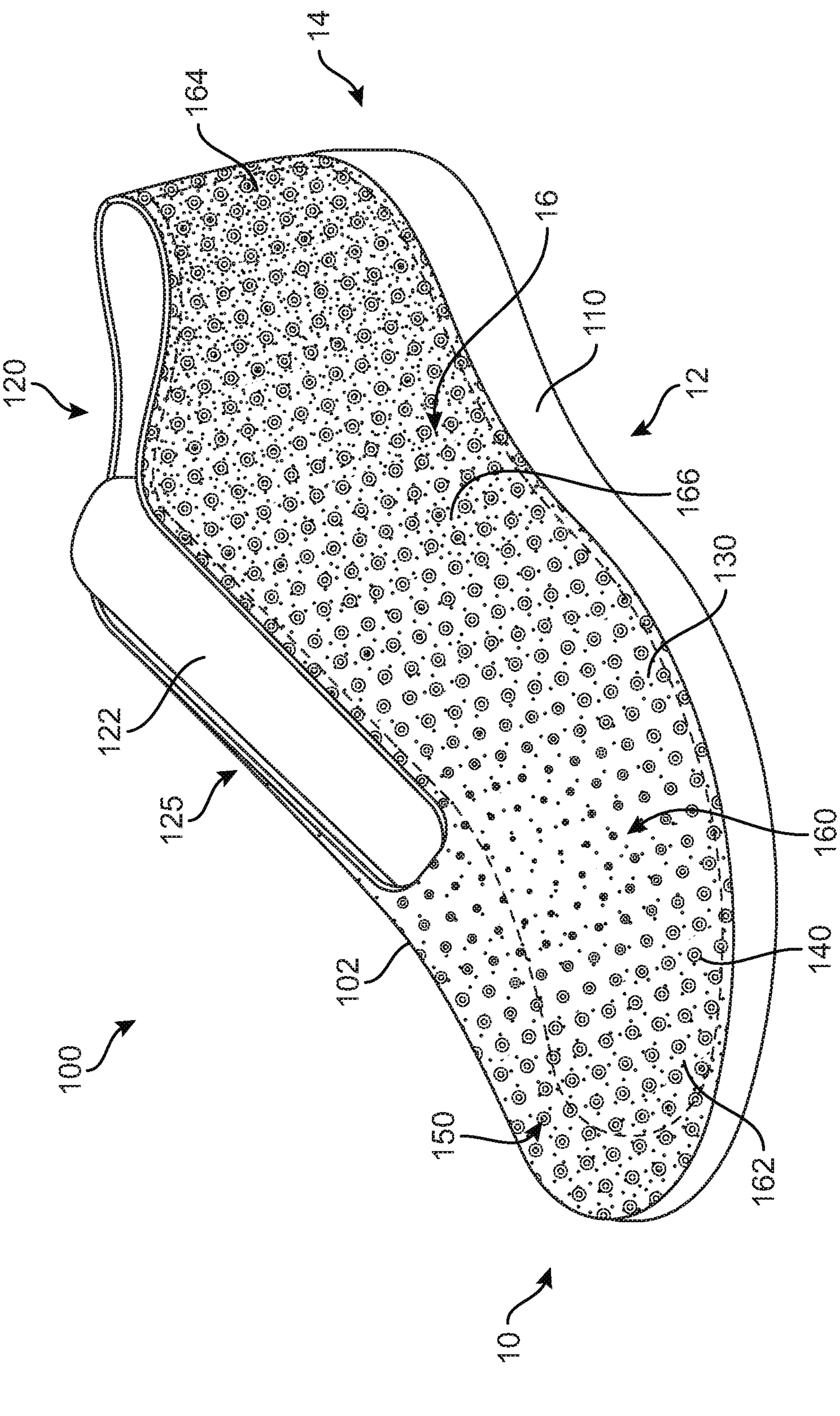
FIG. 1 is a schematic isometric view of an embodiment of a lateral side an article of footwear.
Figure 2:
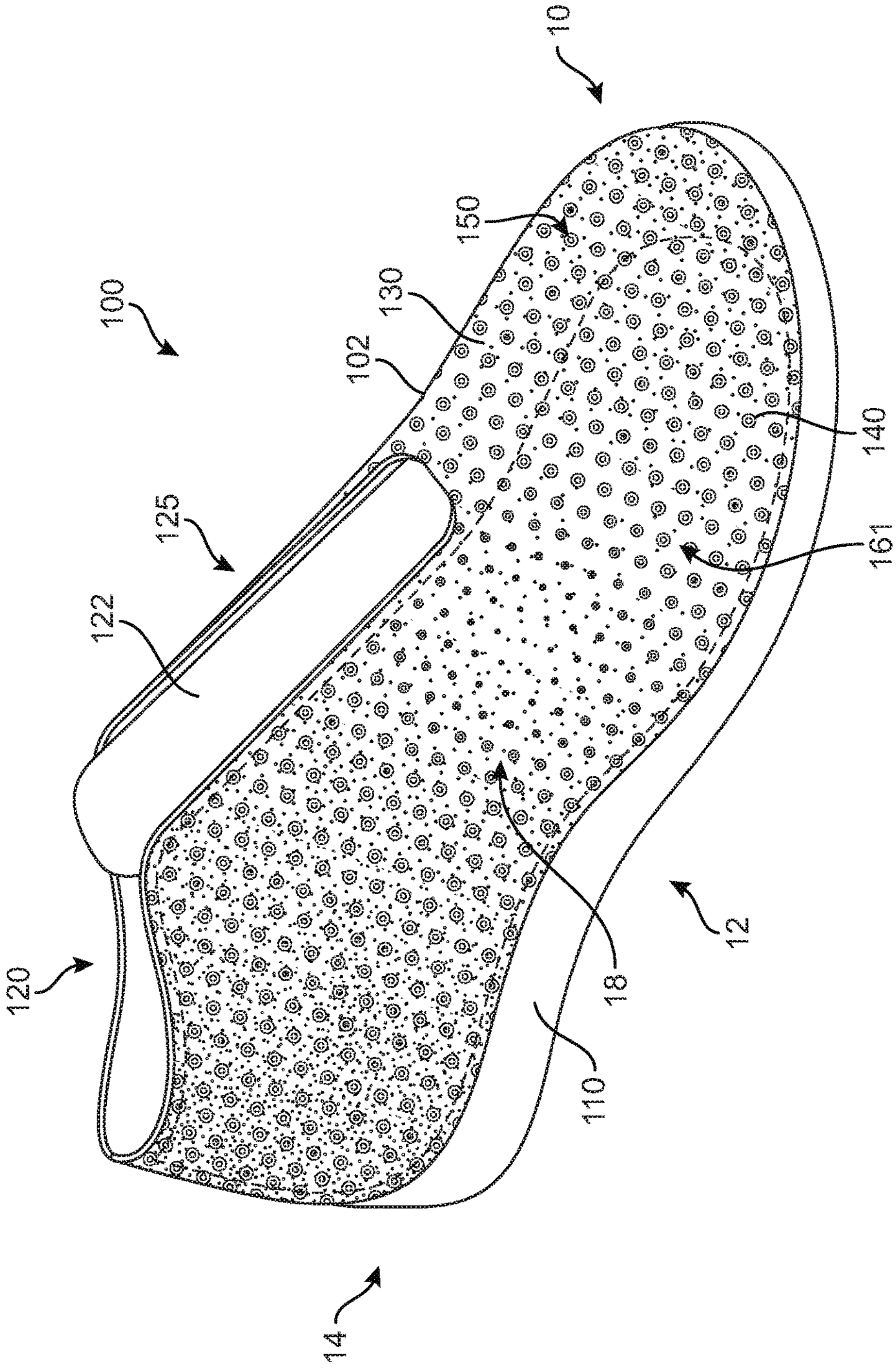
FIG. 2 is a schematic isometric view of an embodiment of a medial side of an article of footwear.

FIGS. 1-2 are schematic isometric views of an embodiment of an article of footwear 100, also referred to hereafter as simply article 100. Article 100 may be configured as various kinds of footwear including, but not limited to: hiking boots, soccer shoes, football shoes, sneakers, running shoes, cross-training shoes, rugby shoes, basketball shoes, baseball shoes as well as other kinds of shoes. Moreover, in some embodiments article 100 may be configured as various other kinds of non-sports related footwear, including, but not limited to: slippers, sandals, high heeled footwear, loafers as well as any other kinds of footwear.

Although the embodiments depict articles of footwear, the systems and methods taught in the detailed description may also be applied to other kinds of articles, such as articles of clothing or apparel. Exemplary articles of clothing or apparel include, but are not limited to: gloves, helmets, hats, jackets, shirts, pants, socks, various kinds of pads, as well as other kinds of clothing, apparel and/or sporting equipment.

Referring to FIG. 1, for purposes of reference, article 100 may be divided into forefoot portion 10, midfoot portion 12 and heel portion 14. Forefoot portion 10 may be generally associated with the toes and joints connecting the metatarsals with the phalanges. Midfoot portion 12 may be generally associated with the arch of a foot. Likewise, heel portion 14 may be generally associated with the heel of a foot, including the calcaneus bone. In addition, article 100 may include lateral side 16 and medial side 18. In particular, lateral side 16 and medial side 18 may be opposing sides of article 100. Furthermore, both lateral side 16 and medial side 18 may extend through forefoot portion 10, midfoot portion 12 and heel portion 14.

It will be understood that forefoot portion 10, midfoot portion 12 and heel portion 14 are only intended for purposes of description and are not intended to demarcate precise regions of article 100. Likewise, lateral side 16 and medial side 18 are intended to represent generally two sides of an article, rather than precisely demarcating article 100 into two halves.

For consistency and convenience, directional adjectives are employed throughout this detailed description corresponding to the illustrated embodiments. The term "longitudinal" as used throughout this detailed description and in the claims refers to a direction extending a length of an article. In some cases, the longitudinal direction may extend from a forefoot portion to a heel portion of the article. Also, the term "lateral" as used throughout this detailed description and in the claims refers to a direction extending along a width of an article. In other words, the lateral direction may extend between a medial side and a lateral side of an article. Furthermore, the term "vertical" as used throughout this detailed description and in the claims refers to a direction generally perpendicular to a lateral and longitudinal direction. For example, in cases where an article is planted flat on a ground surface, the vertical direction may extend from the ground surface upward. In addition, the term "proximal" refers to a portion of a footwear component that is closer to a portion of a foot when an article of footwear is worn. Likewise, the term "distal" refers to a portion of a footwear component that is further from a portion of a foot when an article of footwear is worn. It will be understood that each of these directional adjectives may be used in describing individual components of an article, such as an upper and/or a sole structure.

Article 100 may include an upper 102 as well as a sole structure 110. In some embodiments, sole structure 110 may be configured to provide traction for article 100. In addition to providing traction, sole structure 110 may attenuate ground reaction forces when compressed between the foot and the ground during walking, running or other ambulatory activities. The configuration of sole structure 110 may vary significantly in different embodiments to include a variety of conventional or non-conventional structures. In some cases, the configuration of sole structure 110 can be configured according to one or more types of ground surfaces on which sole structure 110 may be used. Examples of ground surfaces include, but are not limited to: natural turf, synthetic turf, dirt, as well as other surfaces.

Sole structure 110 is secured to upper 102 and extends between the foot and the ground when article 100 is worn. In different embodiments, sole structure 110 may include different components. For example, sole structure 110 may include an outsole, a midsole, and/or an insole. In some cases, one or more of these components may be optional.

Generally, upper 102 may be any type of upper. In particular, upper 102 may have any design, shape, size and/or color. For example, in embodiments where article 100 is a basketball shoe, upper 102 could be a high top upper that is shaped to provide high support on an ankle. In embodiments where article 100 is a running shoe, upper 102 could be a low top upper.

In some embodiments, upper 102 includes opening 120 that provides entry for the foot into an interior cavity of upper 102. In some embodiments, upper 102 may include a tongue 122 that provides cushioning and support across the instep of the foot. Although not shown in the current embodiment, some other embodiments may include fastening provisions, including, but not limited to: laces, cables, straps, buttons, zippers as well as any other provisions known in the art for fastening articles. In some embodiments, a fastening system of some kind may be applied at fastening region 125, which may correspond with the portion of opening 120 adjacent to tongue 122.

Generally, upper 102 may be comprised of one or more layers of materials or other structures. An exemplary layered configuration is discussed in further detail, and shown in FIGS. 7 and 8. Referring to FIGS. 1 and 2, upper 102 may include a surface layer 130 that provides an outermost layer of the portions of upper 102. In some embodiments, surface layer 130 comprises a generally smooth and continuous outer surface. For example, an upper can be comprised of a smooth layer of material such as synthetic or non-synthetic leather, which may provide an outermost surface for at least some portions of the upper. In other embodiments, surface layer 130 may be non-smooth and/or non-continuous. For example, an upper can be comprised of a mesh material that comprises many holes or spaces.

In some embodiments, upper 102 may be further configured with a plurality of protruding elements 140, also referred to simply as protruding elements 140. The term “protruding element” as used throughout this detailed description and in the claims refers to any element that extends outwardly from the surface of upper 102, i.e., any raised element, portion or member. Although the exemplary embodiment depicts some possible structures for protruding elements 140, it should be understood that the term is not intended to be limiting in terms of size, geometry, material construction or other properties.

In some embodiments, protruding elements 140 comprise raised portions of material that together may comprise a control surface 150. In particular, as objects, such as a ball, may primarily come into contact with protruding elements 140, control surface 150 (comprised of protruding elements 140) may be configured to modify the surface properties of upper 102. In some cases, control surface 150 may be used to enhance traction and/or ball control. Specifically, in some embodiments, when compared with the traction properties of surface layer 130 of upper 102, control surface 150 may provide increased traction with a ball or other object. This can be achieved via various properties of protruding elements 140, including, but not limited to: their shape, size, material construction, relative spacing or density, as well as possibly other properties.

In different embodiments, the geometry of protruding elements 140 may vary. In some embodiments, at least some protruding elements 140 may have a ring-like geometry, including raised outer ring portion 146 and a central recessed portion 147 (see FIG. 8). Additionally, in some embodiments, at least some protruding elements 140 may have a rounded or generally hemispherical geometry. Moreover, other embodiments can incorporate protruding elements having any other kinds of geometry, including, but not limited to: rounded geometries, polygonal geometries, regular geometries, irregular geometries as well as any other kinds of geometries. As discussed in further detail below, the geometry of one or more protruding elements 140 can be selected to achieve any desired properties for control surface 150, such as desired traction properties for applying touch or spin to a ball.

In different embodiments, the diameters of one or more protruding elements 140 could vary. In the exemplary embodiment, the diameters may be on order of 0 to a few millimeters. However, in other embodiments, the diameters could be greater than a few millimeters. Moreover, protruding elements 140 could also vary in height and/or thickness in any manner. The dimensions of one or more protruding elements 140 can be selected to achieve any desired properties for control surface 150, such as desired traction properties for applying touch or spin to a ball.

In different embodiments, the materials used for forming one or more protruding elements 140 could vary. Exemplary materials that could be used include, but are not limited to: materials with ink-like properties, various kinds of polymer materials, rubber materials as well as possibly other kinds of materials. In some embodiments, the type of material used for protruding elements 140 could be selected according to the type of manufacturing process used for applying protruding elements 140 to an upper. For example, in processes where protruding elements are printed onto an upper, the material forming protruding elements 140 may be selected according to three-dimensional printing constraints or factors.

Upper 102 may have a region 160, which includes portions of surface layer 130 and at least some of protruding elements 140. Region 160 may include a first boundary region 162 and a second boundary region 164. An intermediate portion 166 may extend between first boundary region 162 and second boundary region 164. For purposes of clarity, the perimeter of region 160 is indicated in phantom in FIG. 1.

In the exemplary embodiment, region 160 comprises substantially all of lateral side 16 of upper 102. In particular, first boundary portion 162 is associated with forefoot portion 10, while second boundary portion 164 is associated with heel portion 14. However, it will be understood that the size and shape of region 160 may vary in other embodiments. In some other embodiments, for example, region 160 could comprise any region on upper 102.

For purposes of clarity, the configuration of surface layer 130 and protruding elements 140 on lateral side 16 of upper 102 are discussed. However, it can be seen in FIG. 2 that, in the exemplary embodiment, medial side 18, which may be characterized as another region 161 of upper 102, may be configured with similar properties. In particular, the general correspondence of surface layer 130 and protruding elements 140, which is discussed in further detail below, may be somewhat similar on both the lateral and medial sides of upper 102. In other words, in the exemplary embodiment, the configurations discussed for region 160 may similarly apply to region 161.

Figure 3:
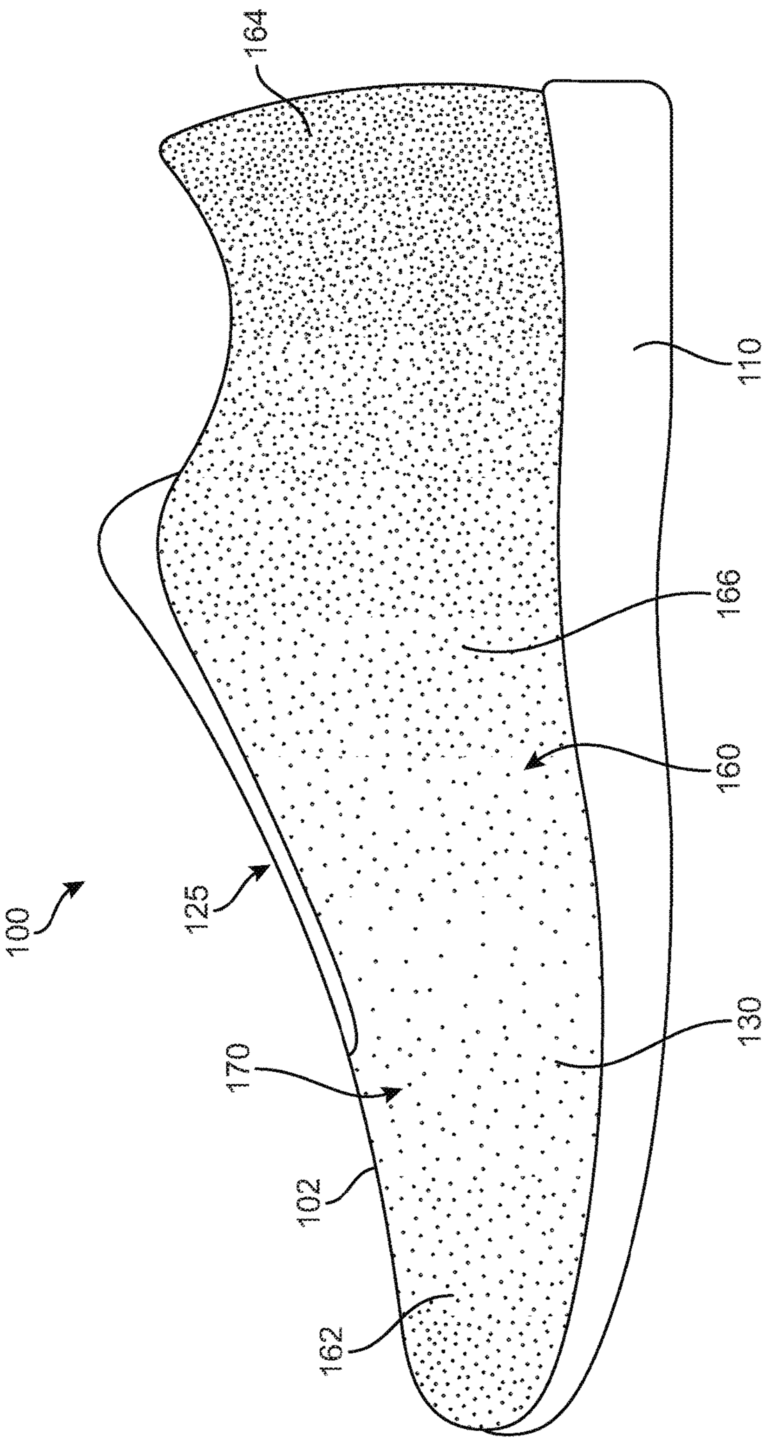
FIG. 3 is a schematic lateral side view of an embodiment of an article of footwear, in which a plurality of protruding elements are not shown for clarity.
Figure 4:
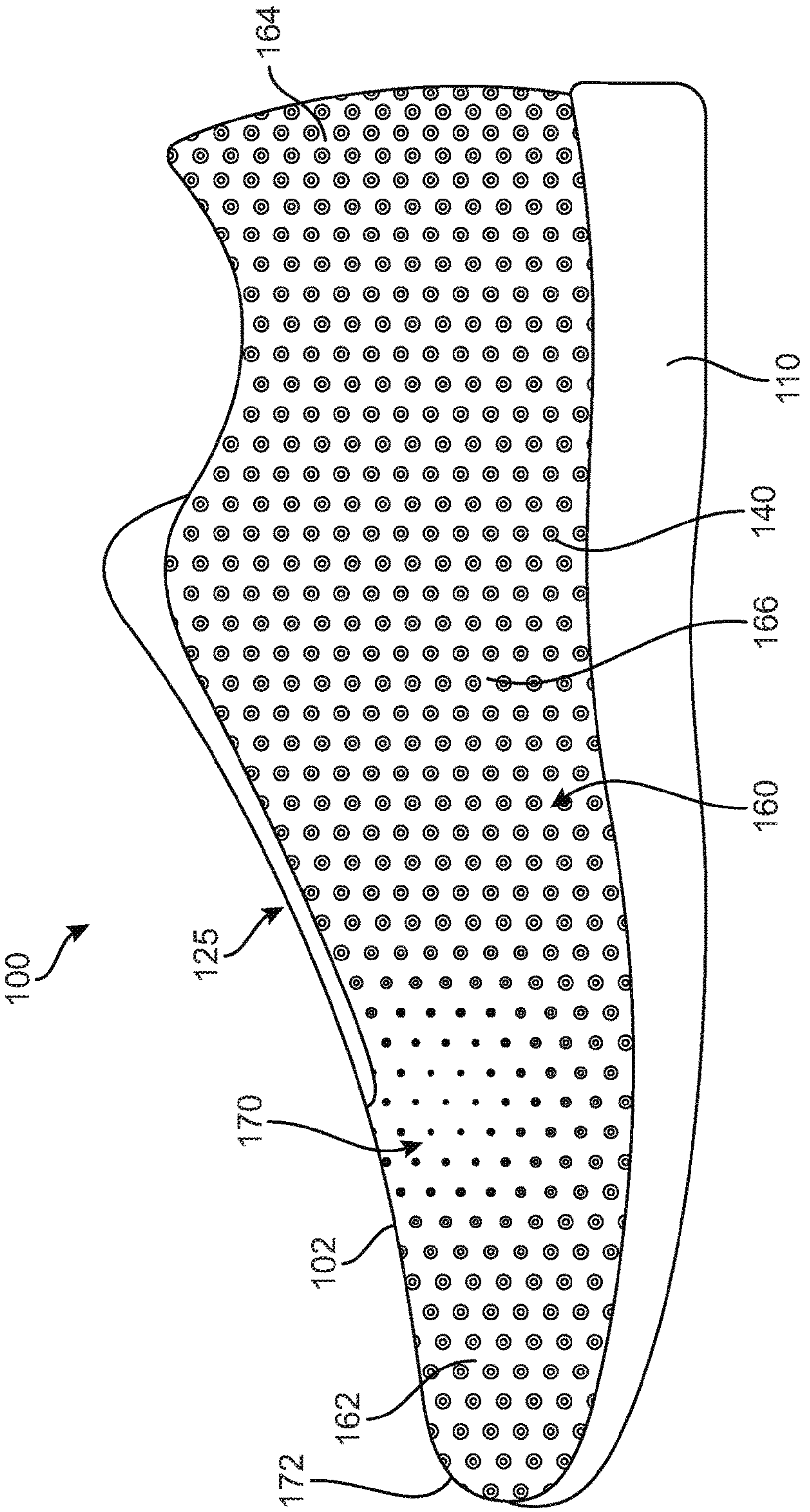
FIG. 4 is a schematic lateral side view of an embodiment of an article of footwear, in which a coloring of a surface layer of an upper of the article of footwear is not shown for clarity.
Figure 5:
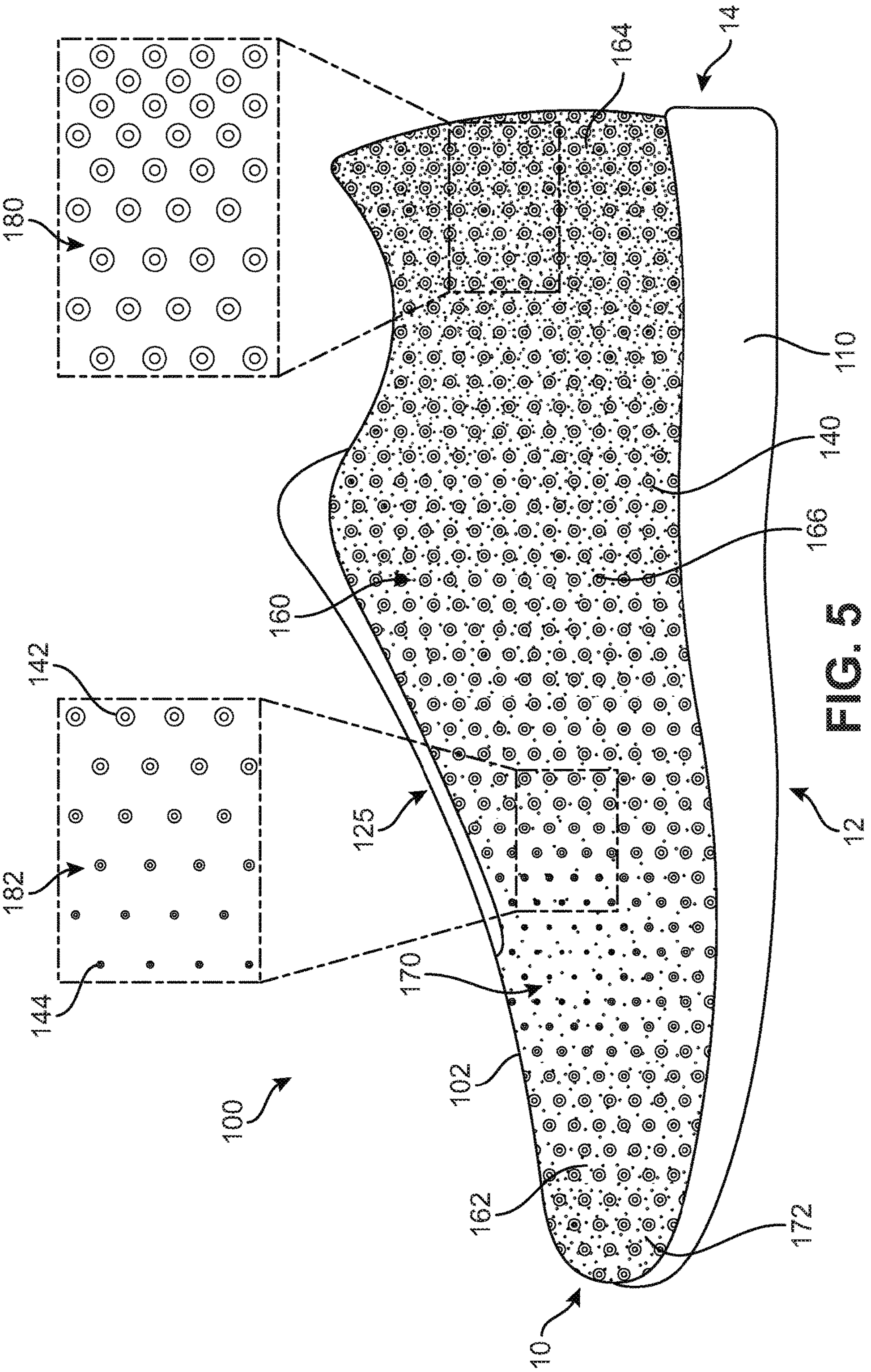
FIG. 5 is a schematic lateral side view of an embodiment of an article of footwear, in which the corresponding variations in coloring and protruding element density can be clearly seen.

FIGS. 3-5 are intended to illustrate the detailed structure of surface layer 130 and protruding elements 140 on upper 102. FIG. 3 shows region 160 of upper 102 without protruding elements 140 for purposes of clarity. Referring first to FIG. 3, surface layer 130 may be colored. In some embodiments, surface layer 130 has at least two colors. In an exemplary embodiment, surface layer 130 has a color gradient. In other words, in the exemplary embodiment, surface layer 130 is colored such that the coloring changes in a gradual manner between two colors on its boundaries. For example, as clearly shown in FIG. 3, region 160 has a first color at first boundary portion 162 and a second color at second boundary portion 164. In the intermediate portion 166 the coloring of surface layer 130 may vary gradually between the first color and the second color. In particular, the coloring may change through multiple colors.

An exemplary coloring configuration for upper 102 is described here, however it will be understood that other colorings are possible in other embodiments. In an exemplary embodiment, the coloring of surface layer 130 varies from a dark red color at heel portion 14 to a yellow color at forefoot portion 10. More specifically, the coloring gradually changes from dark red at heel portion 14 to an orange color around midfoot portion 12, to a yellow coloring at forefoot portion 10. Moreover, in some cases, the coloring shifts from a lighter yellow in forefoot portion 10 to a darker yellow at front end portion 172 of upper 102.

The embodiments depict an approximately linear gradient for the coloring of at least some portions (or sub-regions) of region 160. In particular, the transition in coloring is approximately constant from heel portion 14 to at least midfoot portion 12 and furthermore the color changes in an approximately longitudinal direction. In other embodiments, however, the color gradient may not be linear (i.e., not constant). In some cases, for example, the change in coloring over a particular distance (say, one inch) may be different at different portions of the article. Furthermore, as illustrated in FIG. 1, at least some embodiments may include circular gradients that transition in a radial direction. Moreover, the transition pattern or gradient of the coloring of surface 130 can vary in any other manner, including any linear and/or non-linear patterns or configurations.

FIG. 4 shows region 160 of upper 102 without any coloring on surface layer 130 for purposes of clarity. Referring to FIG. 4, protruding elements 140 may be clearly seen to exhibit a gradient-like pattern within region 160. More specifically, in the exemplary embodiment, the spacing between adjacent protruding elements 140, i.e., the density of protruding elements 140, may vary in a gradient-like manner across region 160. In an exemplary embodiment, the density of protruding elements 140 may generally be lower (i.e., the relative spacing is higher) at first boundary portion 162 than at second boundary portion 164. Moreover, the density may approximately change gradually within intermediate portion 166, which is between first boundary portion 162 and second boundary portion 166.

As seen in FIGS. 3-5, both the change in color of surface layer 130 and the change in the density of protruding elements 140 may not be constant. In particular, for example, the color gradient in region 160 may gradually decrease from second boundary portion 164 through heel portion 14 and midfoot portion 12. However, the color gradient may, for example, have its lightest coloring at portion 170. Here, portion 170 is adjacent to forward end of fastening region 125. From portion 170, the color gradient may gradually become darker again towards front end portion 172 of upper 102. In a similar manner, in some embodiments, the density of protruding elements 140 may decrease somewhat gradually from heel portion 14 through midfoot portion 12. At portion 170, however, the density may be the lowest. In particular, the density of protruding elements 140 may increase from portion 170 to front end portion 172 of upper 102.

In some embodiments, as shown in FIG. 4, the density of protruding elements 140 may vary not only along the longitudinal direction of upper 102, but also in a direction moving from lateral side 16 to medial side 18 of upper 102. For example, at portion 170, the density of protruding elements 140 may vary in an approximately radial direction such that the density increases towards front end portion 172, heel portion 14 and additionally towards sole structure 110.

Figure 6:
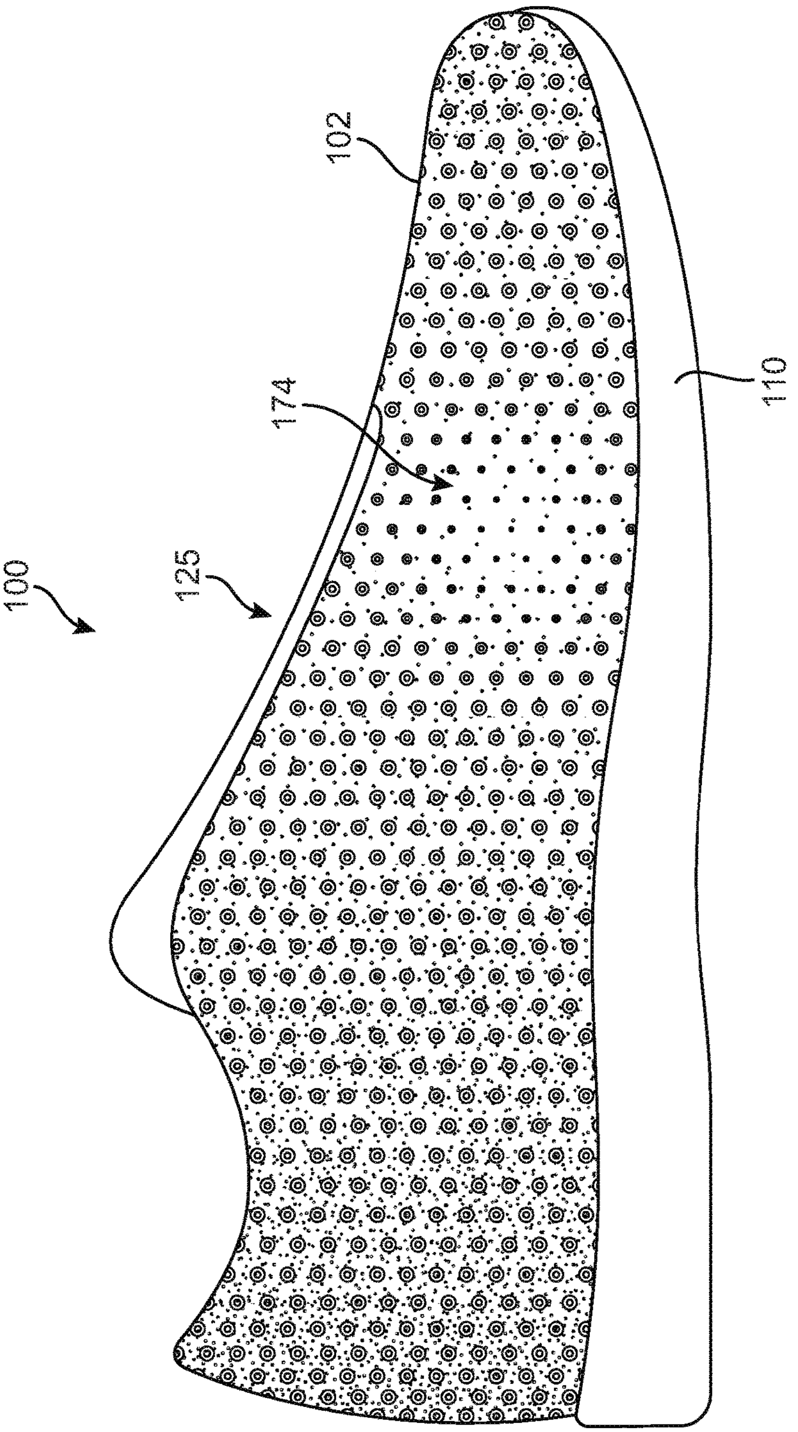
FIG. 6 is a schematic medial side view of an embodiment of an article of footwear.

As seen in FIG. 6, the density of protruding elements 140 may likewise vary in an approximately radial direction at a portion 174. Here, portion 174 may be disposed between the forward end of fastening region 125 and sole structure 110. As seen by comparing FIGS. 5 and 6, in at least some embodiments, the relative locations of portion 170 and portion 174 on lateral side 16 and medial side 18, respectively, may not be symmetric. In particular, portion 170 is seen to be closer to fastening region 125 than portion 174. Thus, the locations of distinct gradient portions can be selectively applied to any desired locations to achieve particular performance results.

FIG. 5 illustrates a lateral side view of upper 102. Referring to FIG. 5, the gradient-like patterns or configurations of colors on surface layer 130 are clearly seen to be in correspondence with the gradient-like pattern or configuration of protruding elements 140. In other words, the density of protruding elements 140 is seen to vary in a manner that is similar to the color gradient of surface layer 130. More specifically, in some embodiments, regions of high density for protruding elements 140 may correspond with regions of darker coloring of surface layer 130. For example, heel portion 14 is seen to have some of the darkest coloring of upper 102, and correspondingly heel portion 14 also has the highest density of protruding elements 140. Likewise, portion 170 and portion 174 (see FIG. 6) are seen to have some of the lightest coloring of upper 102, and correspondingly portion 170 and portion 174 also have the lowest density of protruding elements 140.

For purposes of clarity, the variation in density of protruding elements in region 130 is shown within two enlarged regions in FIG. 5. First enlarged region 180 shows how the density of protruding elements 140 decreases from a very high density to a medium density along heel portion 14. Likewise, second enlarged region 182 shows how the density of protruding elements 140 decreases from a medium density to a low density at forefoot portion 10.

As seen most clearly in FIG. 5, in the exemplary embodiment the geometry of protruding elements 140 may also vary along with the relative density. In some embodiments, for example, protruding elements 140 may be comprised of ring-like protruding elements 142 and dot-like protruding elements 144. Ring-like protruding elements 142 are comprised of a raised outer ring portion 146 that surrounds a recessed central portion 147 (see FIG. 8). In contrast, dot-like protruding elements 144 are generally hemispherical in shape. This variation in geometry may help to reduce the relative density of protruding elements 140 since the decreased diameters of dot-like protruding elements 144 may substantially increase relative spacing with other protruding elements 140.

Using the arrangement described in these embodiments, the characteristics of control surface layer 150 (formed by protruding elements 140) may vary gradually between different portions of article 100. In the exemplary embodiment, for example, a denser grouping or protruding elements 140 may provide maximum traction with a ball for heel kicks. Additionally, the lower density of protruding elements 140 in midfoot portion 12 may facilitate better touch control. The gradual change in protruding portion density may also reduce loss of kicking control that may occur when a ball contacts a region of sharp transition between different surface structures on an article.

Furthermore, the underlying coloring gradient provided on surface layer 130 of upper 102 may provide a visual indicator of the different surface properties of upper 102, which are created by different densities in protruding portions 140. Thus, a user may use the colors on article 100 as a visual indicator for where to contact the ball in order to achieve desired performance, such as passes, soft ball control or kicks.

Figure 7:
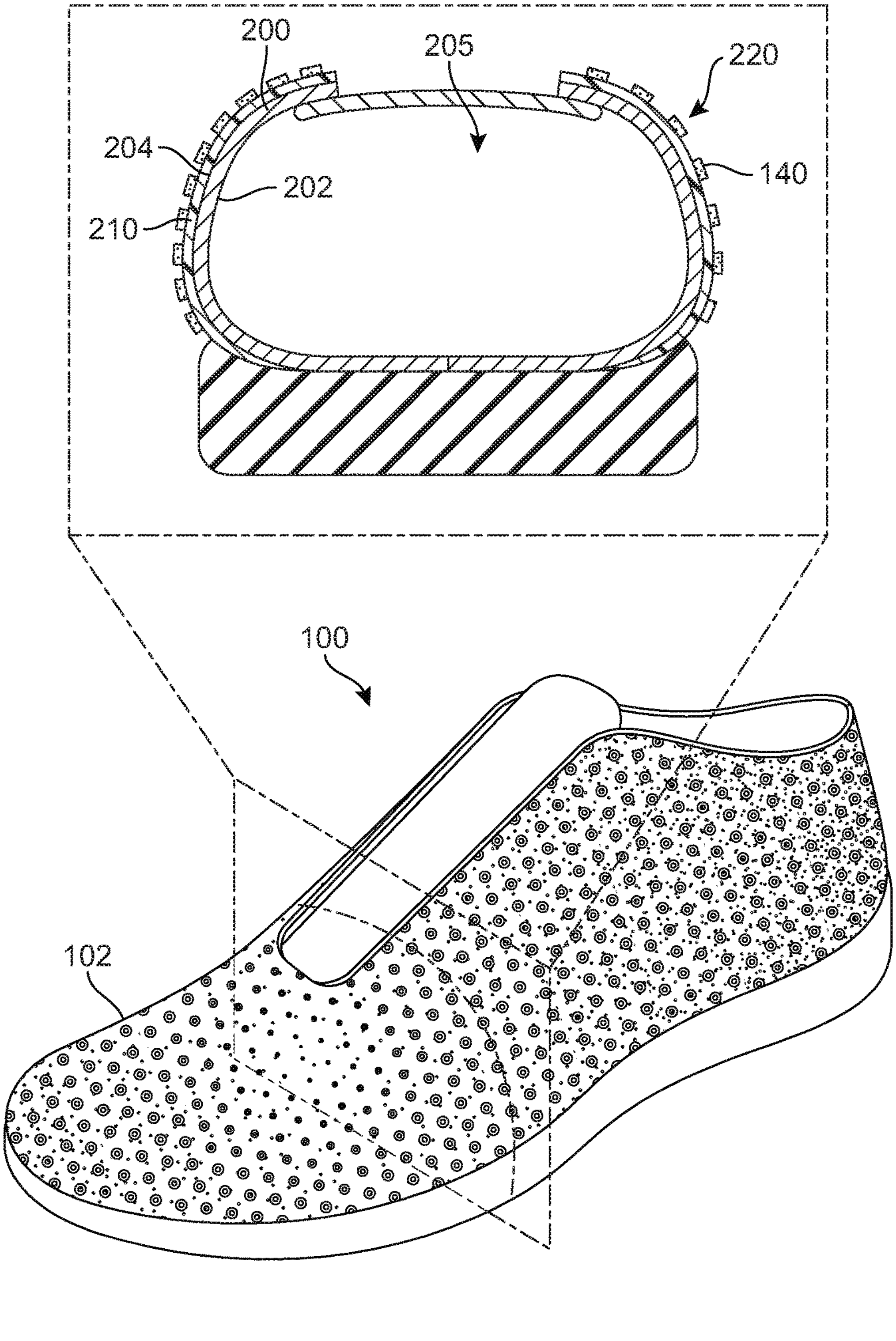
FIG. 7 is a schematic isometric view including an enlarged cross-sectional view of an embodiment of an article of footwear.
Figure 8:
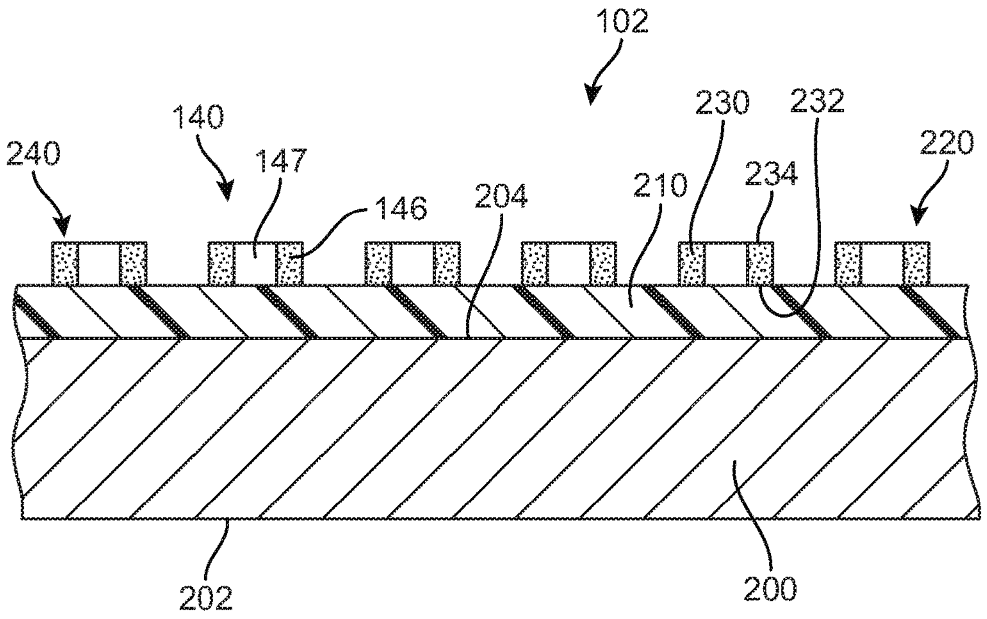
FIG. 8 is a schematic cross-sectional view of a portion of an upper in which the layered structure of the upper is clearly shown.

FIGS. 7 and 8 illustrate views of article 100, including cross-sectional views intended to illustrate the layered structure of upper 102 according to an embodiment. Referring to FIGS. 7 and 8, upper 102 may have a layered structure that is comprised of multiple material layers. Generally, a base layer 200 of upper 102 may provide the structure for upper 102, and may be made of a variety of different materials as discussed in further detail below. In some embodiments, base layer 200 includes a proximal surface 202 and a distal surface 204. In some embodiments, proximal surface 202 may form the interior surface of upper 102. In particular, in some cases, proximal surface 202 of base layer 200 may be disposed against a foot and/or sock when a foot is inserted into the interior cavity 205 of upper 102.

In some embodiments, a coloring ink layer 210 may be disposed on distal surface 204 of base layer 200. In some embodiments, coloring ink layer 210 covers some, but not all, portions of base layer 200. In an exemplary embodiment, coloring ink layer 210 may cover a majority of distal surface 204, so that the intrinsic color of base layer 200 is not visible on the exterior of upper 102. However, it should be understood that in other embodiments coloring ink layer 210 may only cover some portions of distal surface 204, such that some portions of base layer 200 are visible on the exterior of upper 102.

In some embodiments, a control surface layer 220, which is itself comprised of protruding elements 140, may be disposed on coloring ink layer 210. For example, as shown in FIG. 8, a protruding element 230 has a proximal surface 232 that is bonded to coloring ink layer 210. Moreover, a distal surface 234 of protruding element 230 faces outwardly on upper 102. Similarly, the remaining protruding elements of protruding elements 140 are attached to coloring ink layer 210 and their distal surfaces together form a control surface for engaging with a ball or other object.

In some embodiments, each layer associated with upper 102 may be comprised of distinct materials. In some embodiments, base layer 200 is made of a first material, coloring ink layer 210 is made of a second material and control surface layer 220 is made of a third material. In some embodiments, the first material is substantially different from the second material and the second material is substantially different from the third material. In other words, in at least some embodiments, each of the first material, the second material and the third material are different. In other embodiments, however, two or more of the first material, the second material and the third material could be similar.

Exemplary materials for the different layers can be selected according to desired features. For example, the materials comprising base layer 200 may be selected to achieve desired features such as support, durability and/or comfort. Exemplary materials for base layer 200 may include, but are not limited to: fabrics (including woven and non-woven fabrics), mesh materials, knitted materials, leather (including natural or synthetic) as well as possibly other kinds of materials, including any combinations of these materials.

Materials used for coloring ink layer 210 may be selected to achieve desirable features such as color permanence, durability, environmental factors, ease of manufacturing as well as possibly other features. Exemplary materials for coloring ink layer 210 may include, but are not limited to: aqueous inks, solvent inks, UV-curable inks and dye sublimation inks.

In addition, materials used for control surface layer 220 may be selected to achieve desirable performance features such as a desired degree of surface friction with a ball, constant friction in dry and wet conditions, desired degree of compressibility upon contact with a ball, ease of manufacturing, as well as possibly other performance features. Exemplary materials for control surface layer 200 may include, but are not limited to: ink materials (including aqueous, solvent, UV-curable or dye sublimation inks), thermoplastic materials, powders as well any other kinds of three-dimensional printing materials known in the art. In some cases, the type of material selected for control surface layer 200 may be selected according to constraints in three-dimensional printing techniques, which may be utilized to print control surface layer 200 onto coloring ink layer 210 (as discussed in further detail below). Additionally, the materials selected for coloring ink layer 210 and control surface layer 220 may be bond compatible materials. In other words, control surface layer 220 may be formed of a material that is capable of bonding to the material used to form coloring ink layer 210.

As seen in both FIGS. 7 and 8, this layered structure for upper 102 provides for portions of control surface layer 220 and coloring ink layer 210 to be visible on the exterior of upper 102. For example, as seen in FIG. 8, someone viewing the exterior surface of upper 102 would see the distal surfaces 240 of protruding elements 140, as well as portions 250 of coloring ink layer 210 that are exposed between adjacent protruding elements 140. Moreover, in some cases, the sidewall portions 242 of protruding elements 140 may also be visible on the exterior of upper 102.

Although the embodiments depict a control surface layer comprised of many small protruding elements, in other embodiments a control surface layer may be comprised of protruding elements or other protruding portions having a variety of different sizes and/or shapes. In particular, in other embodiments the size and shape of protruding elements need not be uniform.

Figure 9:
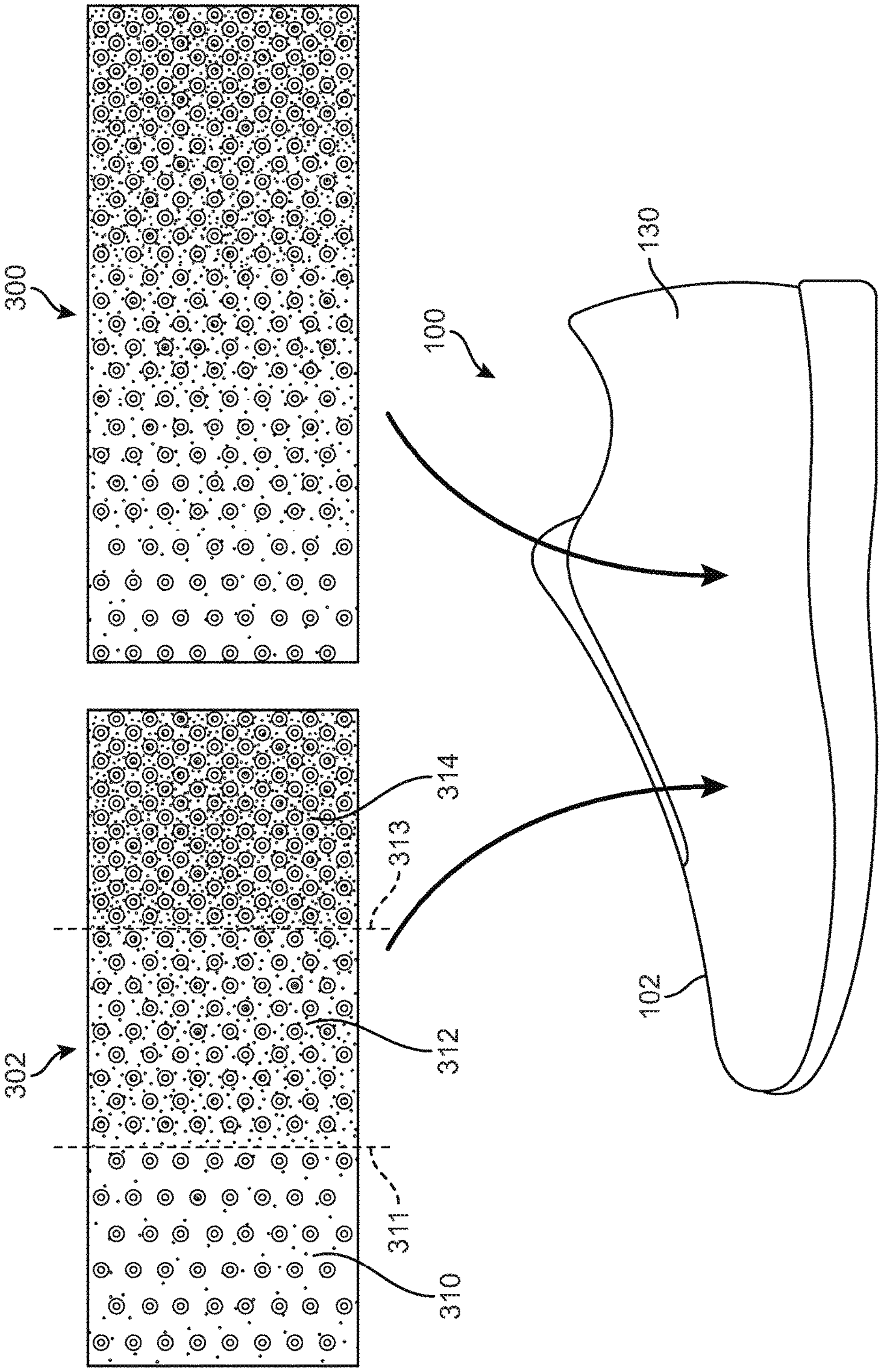
FIG. 9 is a schematic side view of an embodiment of an article of footwear, in which a discrete gradient-like pattern and a continuous gradient-like pattern are shown.
Figure 10:
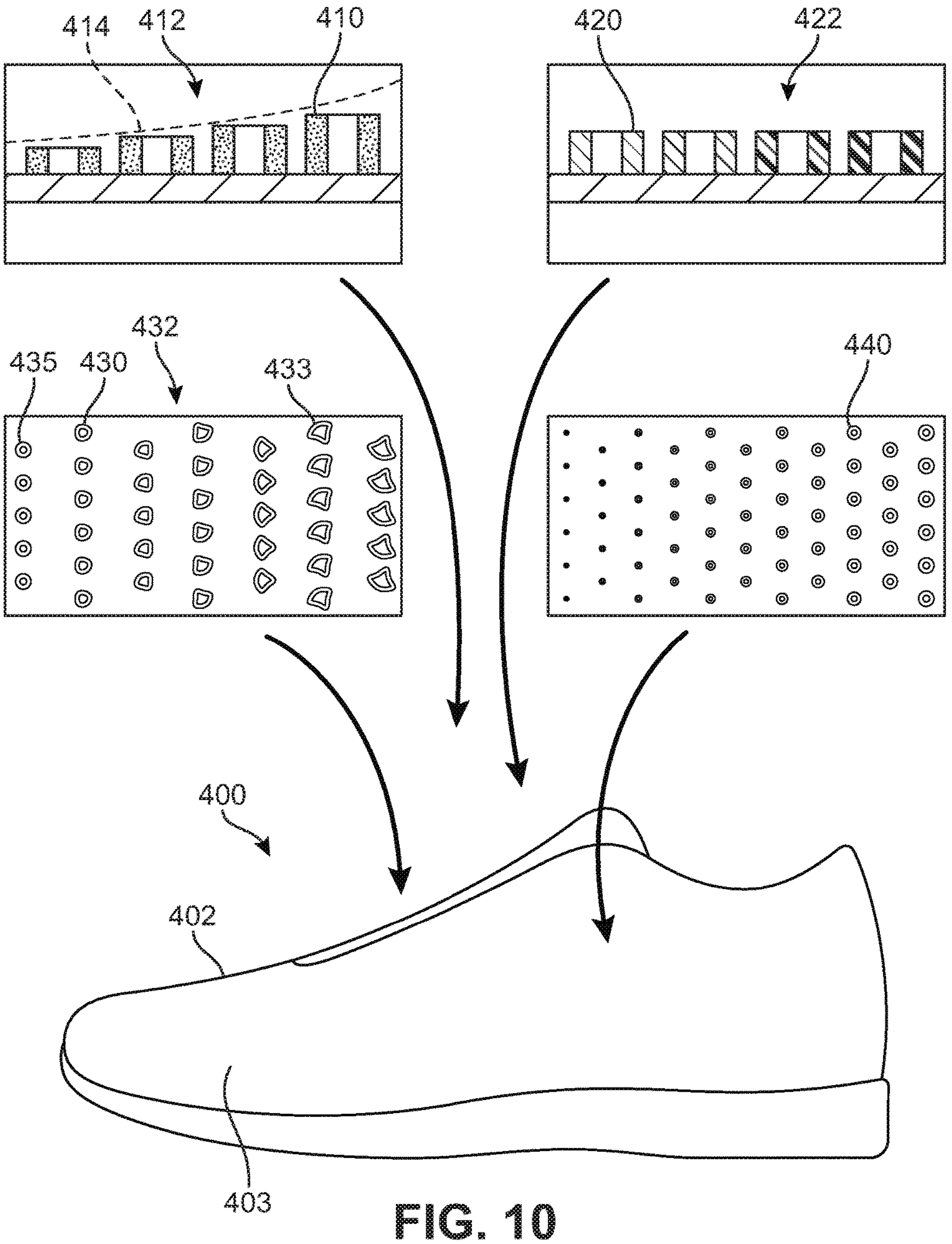
FIG. 10 is a schematic side view of an embodiment of an article of footwear, in which variations of different properties of protruding elements are seen.

FIGS. 9 and 10 illustrate potential variations in the transition pattern of surface layer 130 and protruding elements 140, which may be utilized in different embodiments. Referring first to FIG. 9, embodiments may utilize a gradual transition pattern 300 or a discrete transition pattern 302. The gradual transition pattern 300 may provide a near continuous variation in coloring and/or protruding element density. This gradual change in coloring and protruding element patterns has been described previously in the exemplary embodiments of FIGS. 1-7. In contrast, the discrete transition pattern 302 may provide a more abrupt change in coloring and/or protruding element pattern. In particular, the exemplary discrete transition pattern 302 includes three distinct zones: a first zone 310 and a second zone 312 separated by a first transition boundary 311, as well as a third zone 314 that is separated from the second zone 312 by a second transition boundary 313. In this case, the coloring of surface layer 130 and the approximate density of protruding elements 140 is substantially constant within each zone, but varies from one zone to another. Of course while the embodiment depicts three distinct zones, other embodiments could incorporate any number of discrete zones. Furthermore, the zones may be arranged in a variety of configurations on upper 102, and may not necessarily be disposed adjacent to one another in a lateral direction.

Although the exemplary embodiment depicts variations in the relative spacing or density of protruding elements that correspond with variations in the coloring of a surface layer of an upper, in other embodiments other properties of protruding elements may be varied in a manner that corresponds to the underlying coloring of the upper. Exemplary properties of protruding elements that could be varied include, but are not limited to: diameter, height, geometry, material construction as well as possibly other properties.

FIG. 10 illustrates a schematic view of an article 400, including upper 402, and various different patterns of protruding elements that may be configured on surface layer 403 upper 402. Referring to FIG. 10, protruding elements 410 may have a variable height configuration 412, in which the height of protruding elements 410 varies in a manner that corresponds to changes in the underlying color of surface layer 403. Variations in the height of protruding elements 410 may help provide a contoured control surface 414, which may help impart spin to a ball during some kinds of kicks.

A variable material configuration 422, shown for protruding elements 420, may also vary in a manner that corresponds to the underlying color of surface layer 403. For example, in some cases, the rigidity of protruding elements 420 may vary in a gradual, or gradient-like, manner. This variation in rigidity may allow for increased ball control, as a wearer can apply different degrees of energy return to a ball by kicking the ball at different areas of upper 402.

A variable shape configuration 432, shown for protruding elements 430, may also vary in a manner that corresponds to the underlying color of surface layer 403. For example, in some cases, the shapes of protruding elements 430 may varying from having polygonal shapes 433 to substantially rounded shapes 435 in a gradual, or gradient-like, manner. This variation in shape of protruding elements 430 may allow a user to change between different kinds of ball control provided by the different protruding element geometries.

FIG. 10 also shows protruding elements 440, which vary in both approximate density and diameter in a corresponding manner with the coloring of surface layer 403. In particular, protruding elements 440 are seen to exhibit a similar transitional configuration as the protruding elements in the previous embodiments. As previously discussed, such a configuration may create different kicking zones for a user, which gradually transition across the upper.

FIGS. 11 through 16 illustrate schematic views of various steps in a process for making an article of footwear that includes some of the features discussed above and shown in FIGS. 1-10. It will be understood that this method is only intended as an example, and in other embodiments articles with the previously discussed features could be manufactured in any other manner.

Figure 11:
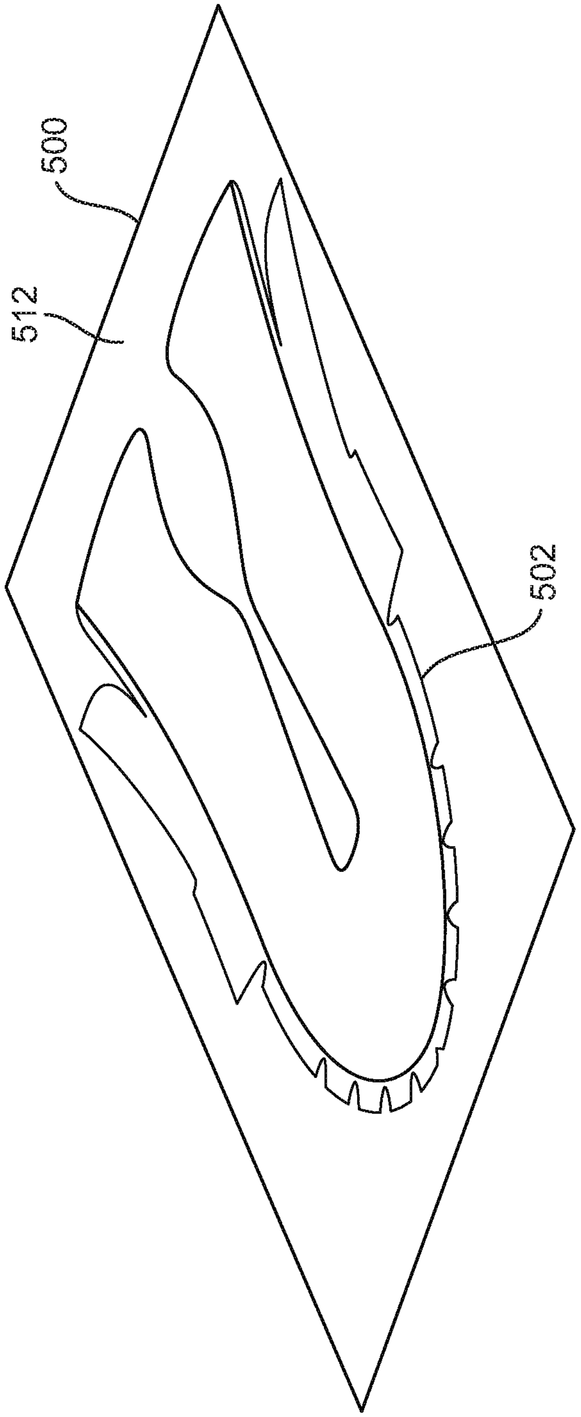
FIG. 11 is a schematic view of an embodiment of a base material element including a pattern for a base layer of an upper.

Referring first to FIG. 11, a base material element 500 is acquired or received. In some embodiments, base material element 500 may be a sheet of stock material used for constructing uppers. The specific kind of material used can be selected to achieve the desired material composition for the base layer of an upper, and can include any of the materials discussed above with respect to base layer 200 of upper 102, as well as any other kind of material. In an exemplary embodiment, base material element 500 has an upper surface 512, which may be oriented towards a printing head during a printing process (discussed below). Furthermore, base material element 500 may include a pattern 502 for a portion of base material element 500 that will form the base layer of an article of footwear.

Figure 12:
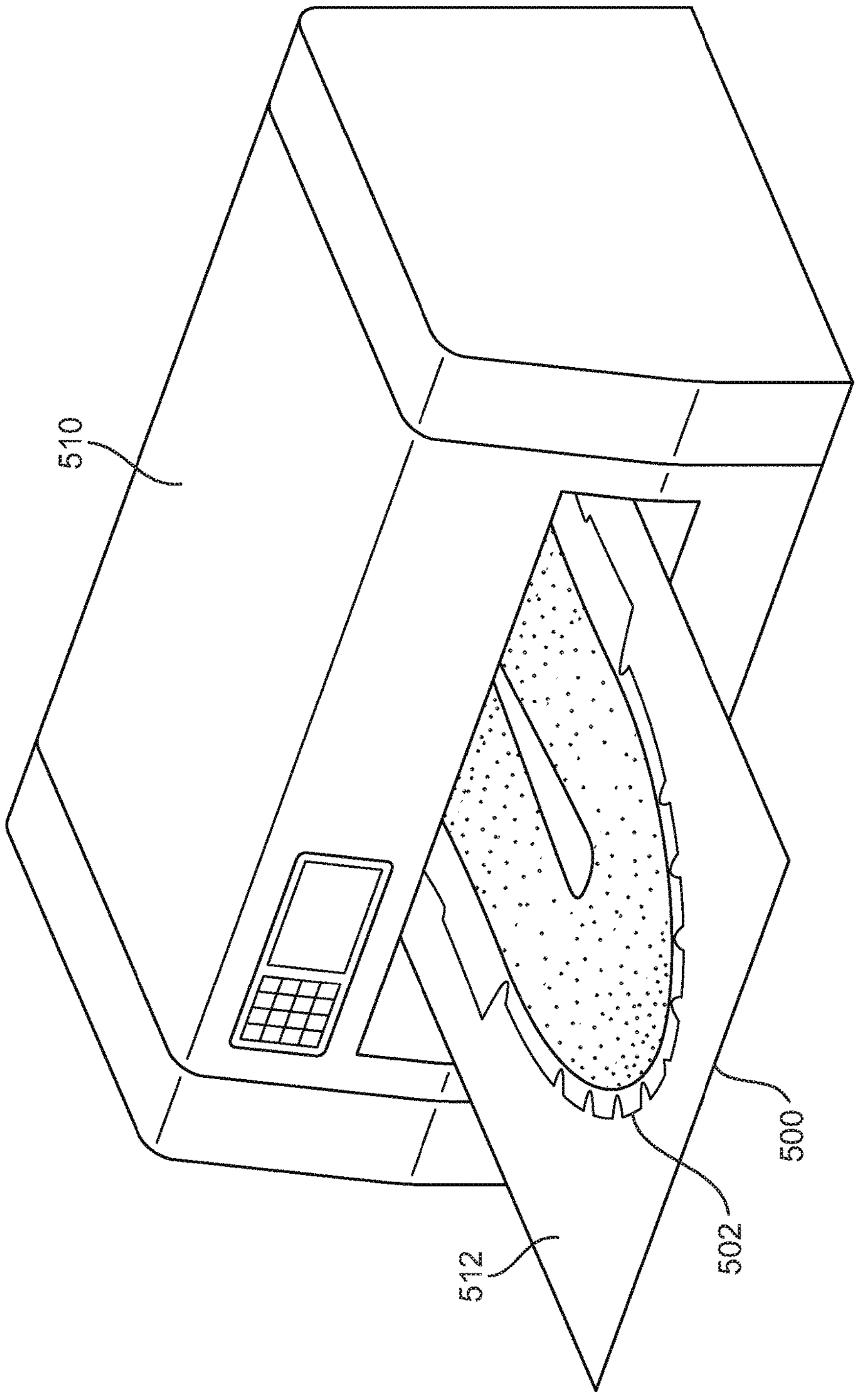
FIG. 12 is a schematic view of an embodiment of a step of printing a coloring ink layer onto the base material element of FIG. 11.

Next, as shown in FIG. 12, base material element 500 may be fed through a printing system 510 in order to apply a color gradient on an upper surface 512 of base material element 500. As shown in FIG. 12, in at least some embodiments, color may only be printed onto the region of base material element 500 associated with pattern 502.

In different embodiments, various printing techniques could be used to apply a coloring layer to base material element 500. These printing techniques can include, but are not limited to: toner-based printing, liquid inkjet printing, solid ink printing, dye-sublimation printing, inkless printing (including thermal printing and UV printing), MEMS jet printing technologies as well as any other methods of printing. In some cases, printing system 510 may make use of a combination of two or more different printing techniques. The type of printing technique used may vary according to factors including, but not limited to: material of the target article, size and/or geometry of the target article, desired properties of the printed image (such as durability, color, ink density, etc.) as well as printing speed, printing costs and maintenance requirements.

Figure 13:
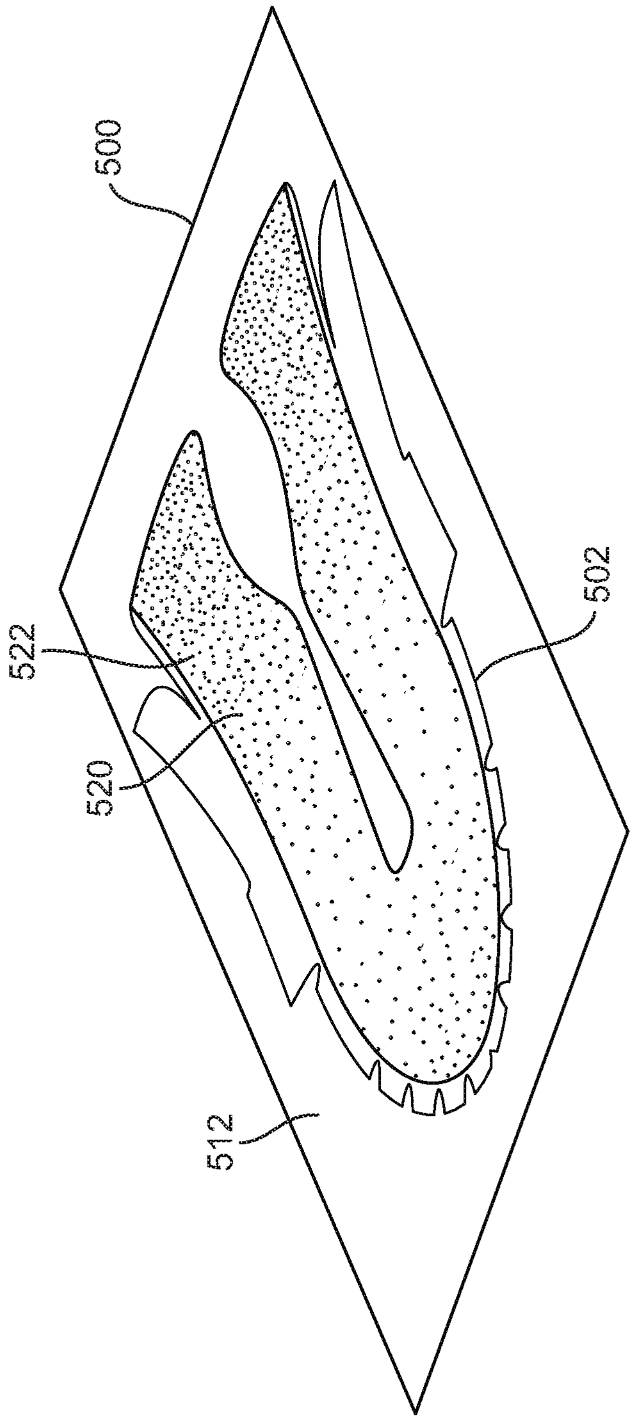
FIG. 13 is a schematic view of an embodiment of a base material element in which the pattern for a base layer has a gradient-like coloring.

As seen in FIG. 13, the resulting base material element 500 has the desired color gradient on base material element 500. Specifically, the portion of base material element 500 corresponding to a base layer 520 of an upper now has a coloring ink layer 522 on its upper surface 512.

Figure 14:
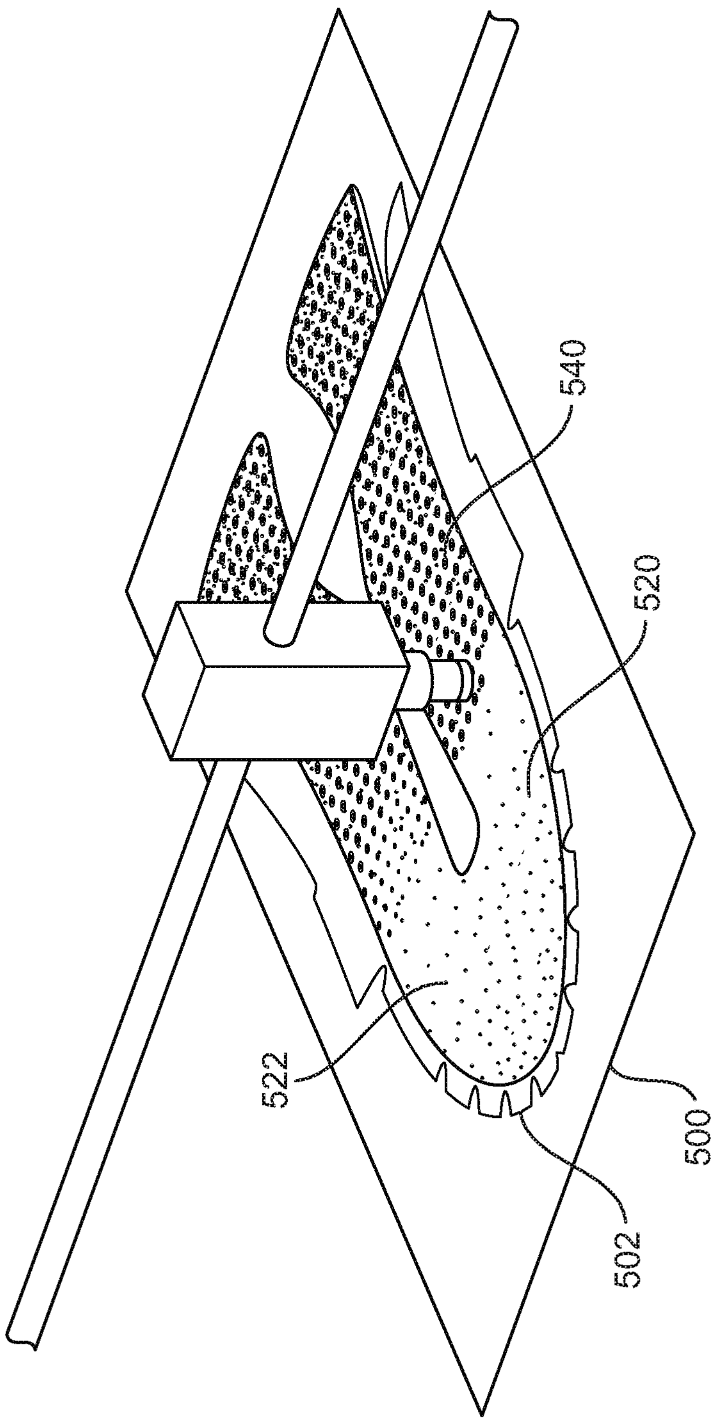
FIG. 14 is a schematic view of an embodiment of a step of printing protruding elements onto the base material element of FIG. 12.
Figure 15:
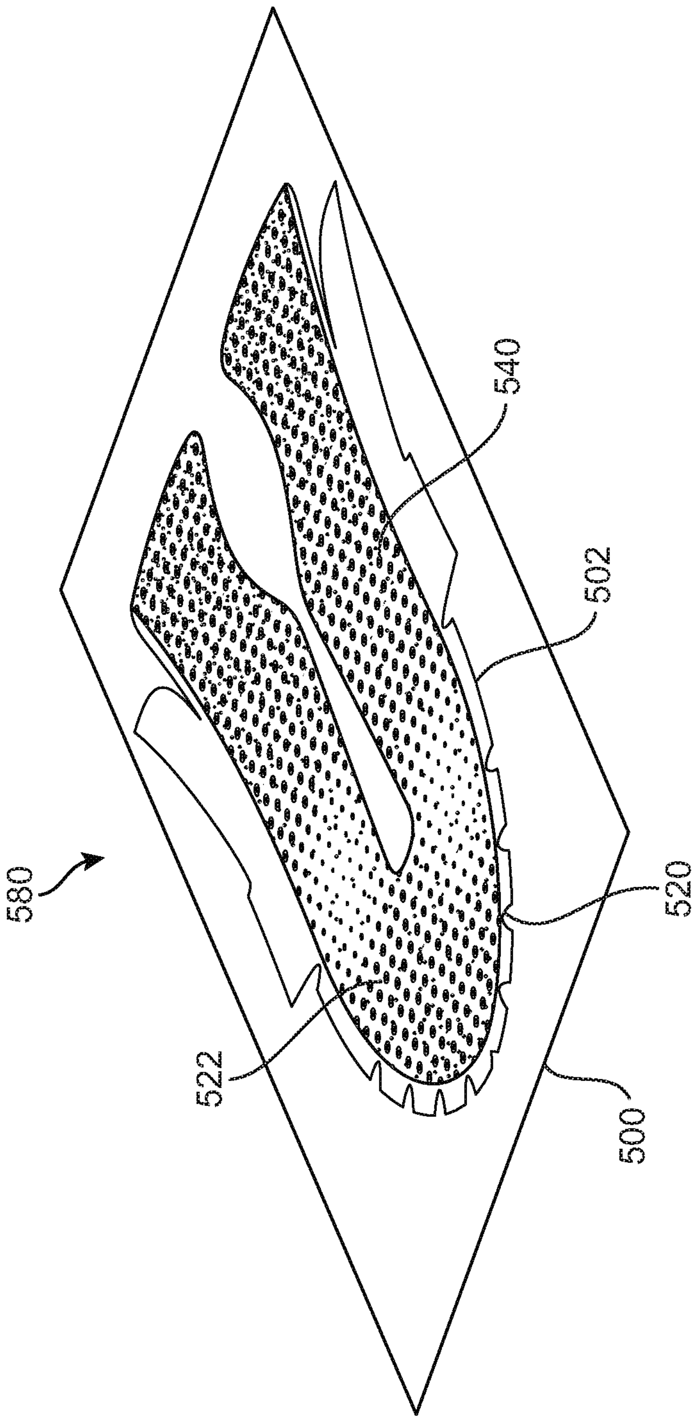
FIG. 15 is a schematic view of an embodiment of a base material element in which a coloring ink layer and a control surface layer have been applied to the base sheet of material.
Figure 16:
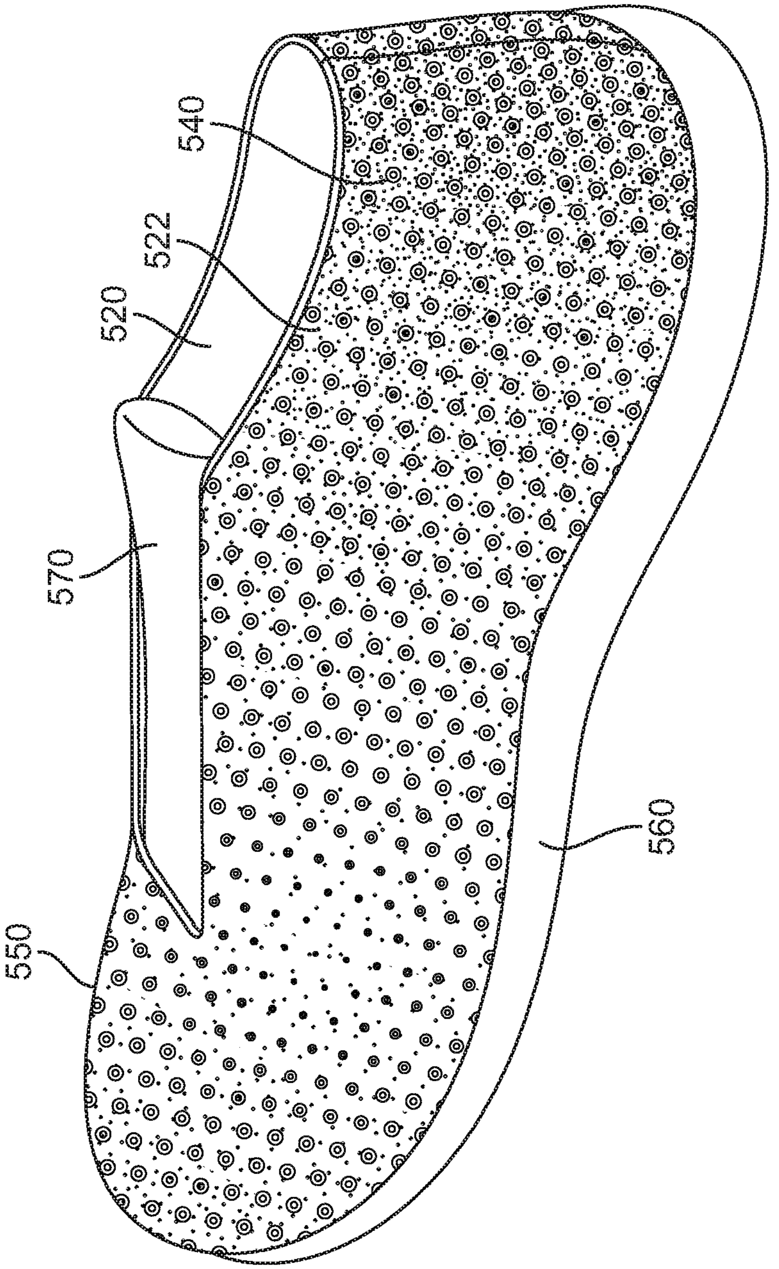
FIG. 16 is a schematic rear isometric view of an embodiment of an article of footwear.

Next, as shown in FIG. 14, protruding elements 540 may be printed directly onto coloring ink layer 522. Protruding elements 540 may be printed using traditional ink printing techniques (including any of the techniques listed above) or any three-dimensional printing techniques known in the art. In an exemplary embodiment, multiple layers of a printing substance are printing onto coloring ink layer 522 to create a three-dimensional structure for protruding elements 540. The resulting composite structure 580 is shown in FIG. 15. In particular, composite structure 580 includes material 500, coloring ink layer 522 and protruding elements 540.

After cutting base layer 520 from the excess portions of material 500, upper 550 may be formed by stitching (or otherwise bonding) portions of base layer 520 together. In some cases, a sole structure 560 and tongue 570 may be applied to finish the article.

As previously discussed, the embodiments are not intended to be limited to articles of footwear. Still other embodiments may utilize similar systems and methods applied to other types of articles, including articles of apparel. It is contemplated, for example, that another embodiment could include a glove having a color gradient and protruding elements arranged in a pattern that corresponds to the color gradient.

While various embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

What is claimed is:

1. A method of making an article of footwear, comprising:

printing a coloring ink layer onto a surface of a base material element, the resulting coloring ink layer having an inner side disposed against the surface of the base material element and an outer side that is opposite of the inner side;

printing a plurality of protruding elements onto the outer side of the coloring ink layer, thereby forming a composite structure comprised of the base material element, the coloring ink layer and the plurality of protruding elements; and forming an upper for the article of footwear from the composite structure.

2. The method according to claim 1, wherein at least a portion of the base material element corresponds to a base layer for the formed upper.

3. The method according to claim 1, wherein forming the upper includes cutting the composite structure to separate the portion of the base material element corresponding to the base layer from a surrounding material portion.

4. The method according to claim 1, wherein printing the coloring ink layer is accomplished using a first printing system and wherein printing the plurality of raised protrusions is accomplished using a second printing system.

5. The method according to claim 4, wherein the first printing system and the second printing system are the same printing system.

6. The method according to claim 4, wherein the first printing system and the second printing system are different printing systems.

7. The method according to claim 1, wherein printing the plurality of raised protrusions is accomplished by printing successive layers of a printable material onto the coloring ink layer.

8. An upper for an article of footwear, comprising:

a layered structure, further comprised of:

a base layer comprised of a first material;

a coloring ink layer that covers at least a portion of the base layer, the coloring ink layer being comprised of a second material;

a control surface layer disposed on the coloring ink layer, the control surface layer being comprised of a third material;

wherein the first material is different from the second material and wherein the second material is different from the third material; and wherein portions of the coloring ink layer are visible on an exterior surface of the upper.

9. The upper according to claim 8, wherein the control surface layer is comprised of a plurality of protruding elements that are bonded to the coloring ink layer.

10. The upper according to claim 8, wherein the coloring ink layer is substantially thinner than the base layer.

11. The upper according to claim 8, wherein the coloring ink layer is substantially thinner than the control surface layer.

12. The upper according to claim 8, wherein the control surface layer is separated from the base layer by the coloring ink layer at all portions of the upper.

13. The upper according to claim 8, wherein the second material and the third material are similar materials.

14. The upper according to claim 8, wherein the second material and the third material are substantially different materials.

15. The upper according to claim 8, wherein the second material and the third material are more similar than the first material and the second material.

16. A method of making an article configured to be worn by a user, comprising:

printing a coloring ink layer onto a surface of a base material element, the resulting coloring ink layer having an inner side disposed against the surface of the base material element and an outer side that is opposite of the inner side;

printing a plurality of protruding elements onto the outer side of the coloring ink layer, thereby forming a composite structure comprised of the base material element, the coloring ink layer and the plurality of protruding elements; and forming the article from the composite structure.

17. The method according to claim 16, wherein the article is an article of apparel.

18. The method according to claim 17, wherein the article is a glove.

19. An article configured to be worn, comprising:

a layered structure, further comprised of:

a base layer comprised of a first material;

a coloring ink layer that covers at least a portion of the base layer, the coloring ink layer being comprised of a second material;

a control surface layer disposed on the coloring ink layer, the control surface layer being comprised of a third material;

wherein the first material is different from the second material and wherein the second material is different from the third material; and wherein portions of the coloring ink layer are visible on an exterior surface of the article.

20. The article according to claim 19, wherein the article is an article of apparel.

21. The article according to claim 19, wherein the article is a glove.

22. The upper according to claim 15, wherein the second material and the third material are printable materials and wherein the first material is a textile material.

* * * * *